United States Patent [19]

Zionts et al.

[11] 4,055,692

[45] Oct. 25, 1977

[54] GAS PUMP COUNTER DISPLAY AND METHOD OF FORMATION THEREOF

[76] Inventors: Bernard S. Zionts, 11 Rye Ridge Parkway, West Hartford, Conn. 06117; Victor Zionts, 6 Jonathan Law Court, Waterford, Conn. 06385

[21] Appl. No.: 692,998

[22] Filed: June 4, 1976

[51] Int. Cl.[2] .................................................. B32B 3/14

[52] U.S. Cl. .......................................... 428/78; 428/63; 428/134; 428/914; 156/252; 156/256; 40/5; 40/61 R

[58] Field of Search ...................... 428/914, 40, 41, 42, 428/134, 63, 77, 78; 40/5, 61 R, 125 A, 135; 156/250, 252, 256

[56] References Cited

U.S. PATENT DOCUMENTS

| | | | |
|---|---|---|---|
| 2,914,873 | 12/1959 | Brennan | 40/125 |
| 3,024,147 | 3/1962 | Brooks et al. | 428/134 |
| 3,432,376 | 3/1969 | Reed et al. | 428/914 |
| 3,464,883 | 9/1969 | Moline et al. | 428/41 |
| 3,623,924 | 11/1971 | Winter et al. | 428/134 |
| 3,737,364 | 6/1973 | Heindl, Jr. | 428/42 |

*Primary Examiner*—William R. Dixon, Jr.

[57] ABSTRACT

A display unit for gas pump counters and the method of formation thereof are presented. The display unit converts a conventional three digit gas pump display unit to a four digit display unit by forming a fourth digit display window in existing gas pump units and then covering the windows with a uniform mask to present a uniform appearance.

6 Claims, 2 Drawing Figures

GAS PUMP COUNTER DISPLAY AND METHOD OF FORMATION THEREOF

BACKGROUND OF THE INVENTION

The recent substantial increases in the price of gasoline have resulted in a problem in totaling and displaying on the gas pump the total price of the amount of fuel delivered to a vehicle. Typical gas pump units have a counter which measures and displays the number of gallons delivered to the vehicle and the total price of the purchase. The counter can count and display up to 99 9/10 gallons and up to $9.99. The total gallons delivered are displayed in a series of three adjacent horizontal windows in a sheet metal display face on the gas pump. Similarly, the total price of the delivered fuel is displayed in a series of three horizontal windows in the display unit face, one window for dollar amounts and two for cents. Numbered counting wheels on the counter show through these windows in the display unit face.

The increased price of gasoline brought on by the fuel shortage and the Arab oil embargo have resulted in a practical problem not heretofore encountered. Specifically, while it was previously virtually unheard of for any standard automobile to have a gas tank large enough to hold more than $9.99 worth of gas, the present price of gasoline often results in more than $10.00 worth of gas being taken by an automobile. The counting units did not have the capacity to show more than $9.99, and the display units on the gas pump did not have the capability of displaying more than $9.99.

As interim measures, some gas stations adopted the practice of counting half the price of the gas being delivered and then doubling the price displayed on the meter. Still others would let the counter run over whereby the amount shown on the counter would be $10.00 less than the amount actually delivered. These practices often cause disputes between the gas station attendant and the motorist, and various state regulatory agencies objected to these practices.

The manufacturers of gas pump meters or counters responded to the problem by modifying existing meter installations to install a fourth counting wheel so that the meters could display up to $99.99. To accommodate this fourth counting wheel and its display, the owners of gas stations were faced with the need to replace the sheet metal display panels on each gas pump in order to provide a fourth window to display the additional dollar digit. The sheet metal display panels are relatively expensive, being in the range of approximately $20.00 or more. Bearing in mind that there are two such display panels on each gas pump, and considering the number of gas pumps in a typical gasoline station and the number of gasoline stations throughout the country, it can be seen that the cost of replacing these display panels is extremely high, ranging literally into the millions of dollars.

SUMMARY OF THE INVENTION

The present invention provides the desired four digit price display without the need to replace th expensive display panel on the gas pump. In accordance with the present invention the display panel is removed from the gas pump, a fourth display window is marked on the display panel at the appropriate location and then cut out in any suitable manner for handling sheet metal by enlarging the present dollar display window. This results in a display line having two uniform die stamped windows and one hand cut and sometimes irregular enlarged window in the price line. A mask in the form of a pressure adhesive decal is then placed over the windows in the price line, the mask having four appropriately located windows to align with the windows and opening ih the price line on the display panel. The display panel is then reinstalled in the gas pump, and the display panel is then suitable for accommodating and displaying the four counting wheels of the meter. Thus, the necessary change in the display panel is accomplished merely by cutting an enlarged window in the existing display panel and then providing a windowed decal to dress up the modified display panel and present a uniform appearance on the price line.

Accordingly, one object of the present invention is to provide novel and improved apparatus and methods for modifying display panels of gasoline pumps.

Another object of the present invention is to provide novel and improved apparatus and methods for modifying display panels of gasoline pumps to accommodate the display of a fourth digit in the price line.

Still another object of the present invention is to provide apparatus and methods for modifying gas pump display panels to provide fourth digit display capability in th price line without the need to replace the display panel.

Other objects and advantages of the present invention will be apparent to and understood by those skilled in the art from the following detailed description and drawings.

BRIEF DESCRIPTION OF THE DRAWING

Referring now to the drawings, wherein like elements are numbered alike in the several figures.

Figure 1:
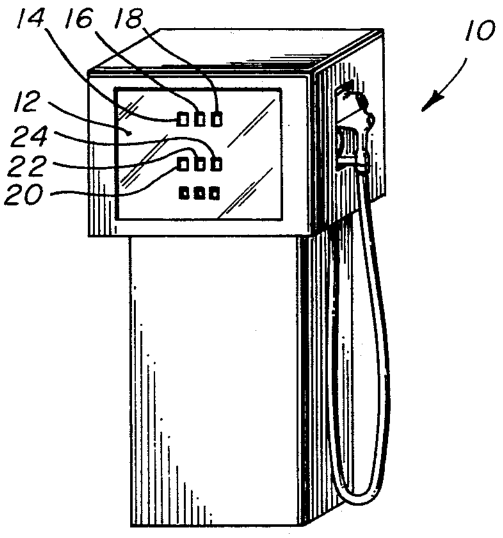
FIG. 1 is a perspective view showing a typical gas pump with a prior art display panel.

DESCRIPTION OF THE PREFERRED EMBODIMENTS:

FIG. 1 depicts a conventional gas pump 10 which has a display plate 12 covering the readout meter for gallons delivered and total price as typically found in such gas pumps. Display plate 12 is a relatively thin sheet metal element normally formed in square or generally rectangular shape or otherwise shaped to the contour of the particular pump. Display plate 12 has a top row of three windows 14, 16 and 18 which form price line and a lower row of three windows 20, 22 and 24 which indicate the number of gallons delivered. As is well known in the art, the windows all line up with wheels on the meter which bear indicia to indicate the number of gallons delivered and provide a running total of the cost of the fuel delivered. Windows 20, 22 and 24 have the capacity to indicate the delivery of 99 9/10 gallons, while windows 14, 16 and 18 have the capacity to show a total of $9.99.

As indicated previously, recent substantial increases in the price of gasoline have made it necessary to provide four digits in the price line so that total accumulated prices of $10.00 or more can be displayed. This requirement has, of course, resulted in the need to add a fourth counting wheel to the price counter in the meter, and that fourth wheel must be displayed to the left of the dollar display normally seen in window 14. Meeting the requirement for the display of the fourth counting wheel has heretofore been accomplished by replacing display plate 12 with an entirely new display plate having four windows provided in the price line. Replacement of the entire display plate is relatively expensive, running on the order of $20.00 or more merely for the new display plate itself.

Figure 2:
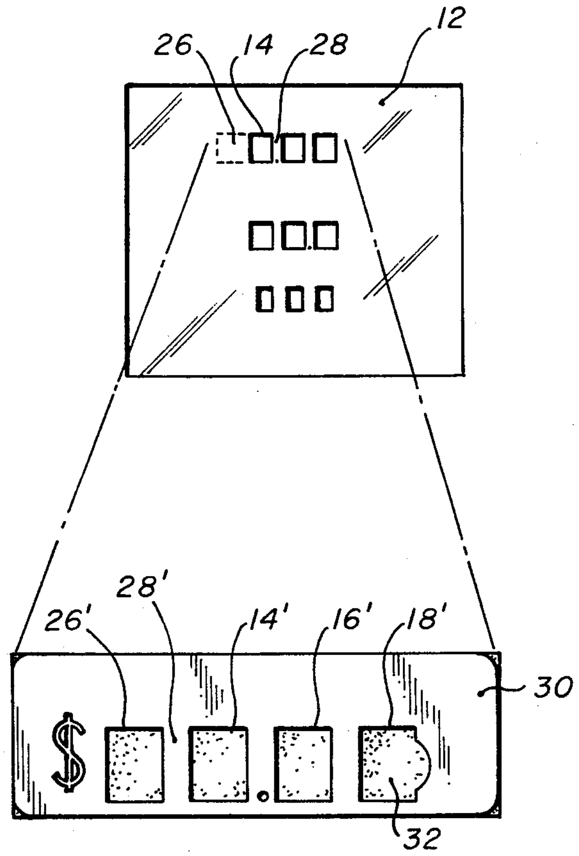
FIG. 2 is an exploded view showing the display panel of a typical gas pump and the decal mask employed in the practice of the present invention to modify the display panel.

In accordance with the present invention, replacement of display plate 12 is unnecessary; rather display plate 12 is modified to provide the desired four window display. Display plate 12, which is held in place by removable screws or other fastener elements, is removed from the face of the gas pump to be worked on for modification. As indicated in the dotted lines in display plate 12 in FIG. 2, the display plate is modified by enlarging window 14 toward the left edge of the display plate to form an additional opening 26. The width of additional opening 26 is equal to the width of window 14 plus the width of the standard spacing 28 between two adjacent windows in the price line. The enlargement of window 14 is accomplished in any convenient manner for handling sheet metal, such as by tin snips or any other suitable tool. After window 14 has been enlarged to form the additional opening 26, the entire window line is covered by a decal or mask 30 which has windows 14', 16', 18' and 26' formed therein. Mask 30 has a pressure sensitive adhesive on the rear surface thereof which is protected by a release paper 32 (release paper 32 being visible through the windows in the mask when the mask is not installed). Openings 14',16' and 18' are positioned and sized so as to align directly with windows 14, 16 and 18 on the original display plate. Window 26' on mask 30 is separated from window 14' by a spacer 28' equal to the standard spacing between windows in the price line on the unmodified display plate 12 so that there are equal spacings between each of the windows in mask 30.

After enlarged opening 26 has been formed in display plate 12, the release paper backing is removed from mask 30, and mask 30 is adhered by pressure to display plate 12 by the application of pressure. Mask 30 is positioned on display plate 12 so that windows 14', 16' and 18' are aligned as precisely as possible with windows 14, 16 and 18 of the display plate. Mask 30 is sized to be larger than and hence overlap the entire price display line area so that it bonds to plate 12. Window 26' then cooperates with enlarged opening 26 to form the fourth window for the display of the fourth counting wheel of the meter, with spacer 28' providing the necessary separation between window 26' and window 14'. The proper placing of mask 30 on display plate 12 completes the modification of the display plate, and the dislay plate can then be reinstalled in the gas pump to cooperate with the new or modified meter which has four digit price capability.

Modification of the display plate in accordance with the present invention results in a total cost, depending on the labor involved, of between approximately $5.00 and $7.00. Thus, a very substantial saving is effected on each display plate; and that saving is, of course, multiplied by the total number of face plates which require modification. Thus, a simple, inexpensive and efficient apparatus and method for accomplishing the necessary change to the face plate is achieved.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A modified display plate for liquid dispensing apparatus, the display plate having:

an array of aligned windows formed in the body of the display plate;

an enlarged window in said array; and a mask mounted on said display plate, said mask having a plurality of windows therein each aligned with each of said display plate windows other than said enlarged window and two windows aligned with the enlarged window of the display plate.

2. A modified display plate as in claim 1 wherein:

said mask has dividers between the windows thereof;

said enlarged window of the display plate is free of dividers; and said mask has dividers aligned with the dividers of the body of the display plate and a divider bridging said enlarged window.

3. The method of modifying a display plate for liquid dispensing apparatus having a plurality of aligned windows forming an indicating array, including the steps of:

enlarging one of the windows of the array of the display plate; and applying a mask to the display plate, said mask having a plurality of windows cooperating with said array of windows of the display plate to form an array of openings of greater number than originally on the display plate.

4. The method as in claim 1 wherein said step of applying a mask includes:

aligning some of said windows of said mask with some of the original windows of said display plates.

5. The method as in claim 1 wherein said step of applying a mask includes:

adhering said mask to the display plate with pressure sensitive adhesive.

6. The method as in claim 1 including the steps of:

removing the display plate from the apparatus prior to enlarging the window; and replacing the display plate on the apparatus after applying the mask to the display plate.

* * * * *

UNITED STATES PATENT AND TRADEMARK OFFICE

CERTIFICATE OF CORRECTION

PATENT NO. : 4,055,692

DATED : October 25, 1977

INVENTOR(S) : Bernard S. Zionts and Victor Zionts

It is certified that error appears in the above-identified patent and that said Letters Patent are hereby corrected as shown below:

Column 1, line 62, "th" should be --the--

Column 2, line 2, "ih" should be --in--

Column 2, line 26, "th" should be --the--

Column 3, line 55, "dislay" should be --display--

IN THE CLAIMS:

Column 4, line 45, (claim 4, line 1) "1" should be --3--

Column 4, line 49, (claim 5, line 1) "1" should be --3--

Column 4, line 53, (claim 6, line 1) "1" should be --3--

Signed and Sealed this

*Twenty-fourth* Day of *May 1983*

[SEAL]

*Attest:*

DONALD J. QUIGG

*Attesting Officer* *Acting Commissioner of Patents and Trademarks*